United States Patent
Cowie et al.

(10) Patent No.: US 8,403,293 B2
(45) Date of Patent: Mar. 26, 2013

(54) AXIALLY ENERGISABLE BALL VALVE

(75) Inventors: Gavin David Cowie, Kincardineshire (GB); Jeffrey Charles Edwards, Aberdeen (GB)

(73) Assignee: Enovate Systems Limited, Aberdeen (GB)

( * ) Notice: Subject to any disclaimer, the term of this patent is extended or adjusted under 35 U.S.C. 154(b) by 279 days.

(21) Appl. No.: 12/878,742

(22) Filed: Sep. 9, 2010

(65) Prior Publication Data
US 2011/0198527 A1    Aug. 18, 2011

Related U.S. Application Data

(63) Continuation-in-part of application No. 11/793,158, filed on Mar. 5, 2008, now abandoned.

(30) Foreign Application Priority Data

Dec. 15, 2004    (GB) ................... 0427400.7

(51) Int. Cl.
    *F16K 5/06* (2006.01)
(52) U.S. Cl. .......... 251/77; 251/163; 251/192; 251/259; 251/315.16
(58) Field of Classification Search .................. 251/163, 251/162, 192, 77, 257, 259, 263, 315.16, 251/315.01
    See application file for complete search history.

(56) References Cited

U.S. PATENT DOCUMENTS

| | | | |
|---|---|---|---|
| 1,995,491 A | 3/1935 | Wynkoop | |
| 2,531,759 A | 11/1950 | Wolf et al. | |
| 2,883,146 A | 4/1959 | Knox | |
| 3,064,937 A | 11/1962 | Pryor | |
| 3,124,333 A | 3/1964 | Sivyer | |
| 3,157,380 A | 11/1964 | Sivyer | |
| 3,245,653 A | 4/1966 | Lavigueur | |
| 3,406,943 A * | 10/1968 | Newell | 251/163 |
| 3,901,315 A | 8/1975 | Parker et al. | |
| 3,934,606 A | 1/1976 | Matthews | |
| 4,029,292 A | 6/1977 | Kramer et al. | |
| 4,296,913 A | 10/1981 | Hoyer | |
| 4,667,929 A | 5/1987 | Narduzzi | |
| 4,683,906 A | 8/1987 | Butler et al. | |
| 4,693,451 A | 9/1987 | Tricini | |
| 4,901,763 A | 2/1990 | Scott | |
| 4,936,547 A | 6/1990 | Obst | |
| 4,940,210 A * | 7/1990 | Gilmore | 251/188 |
| 5,265,845 A | 11/1993 | Gilliam | |
| 5,342,028 A | 8/1994 | Nevrekar | |

FOREIGN PATENT DOCUMENTS

| | | |
|---|---|---|
| FR | 2 567 232 A1 | 1/1986 |
| GB | 1 235 647 | 6/1971 |

* cited by examiner

*Primary Examiner* — John Bastianelli
(74) *Attorney, Agent, or Firm* — Tarolli, Sundheim, Covell & Tummino LLP

(57) ABSTRACT

A ball valve (10) for sealing a conduit (12) is described. The ball valve includes a housing having a throughbore and a valve seat. An apertured ball element (18) is mounted within the housing and is rotatable about an axis of rotation (38) between a throughbore open and a throughbore closed position. The apertured ball element (18) has a first portion (20) and a second portion (22) coupled together which are rotatable and moveable relative to each other. The first portion has a sealing surface for engaging with the valve seat. In use, in the throughbore closed position, the second portion is moveable relative to the first portion to axially displace the first portion from the axis of rotation towards the valve seat such that the sealing surface on the first portion of the apertured ball forms a seal with valve seat.

29 Claims, 6 Drawing Sheets

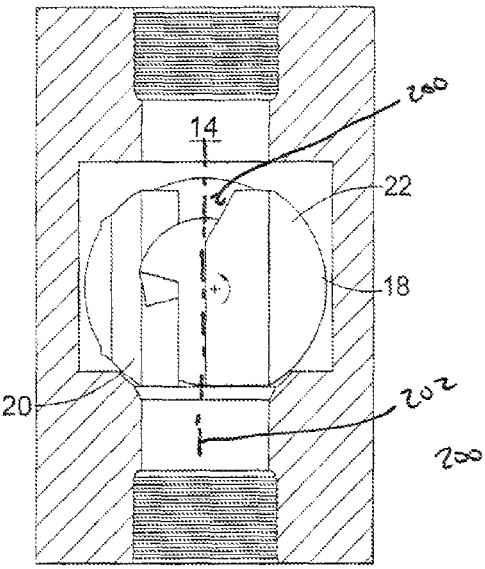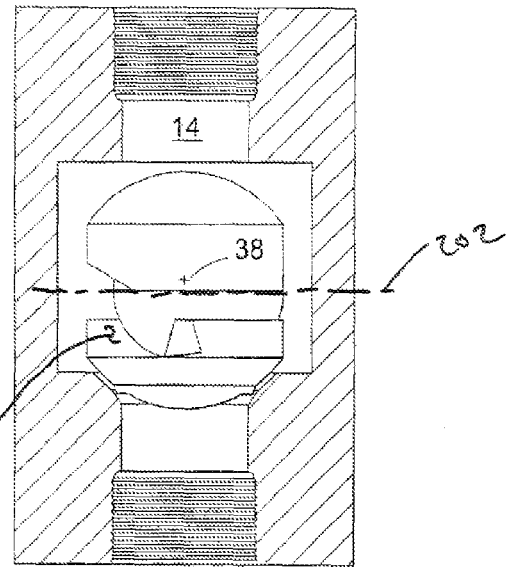
Fig. 4(a)　　　　Fig. 4(b)
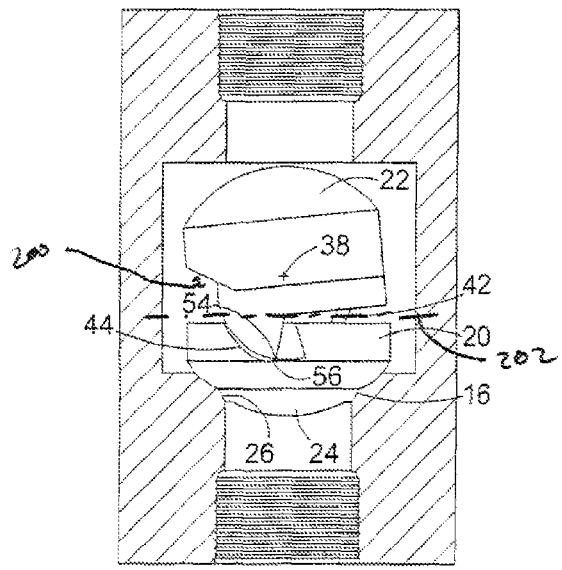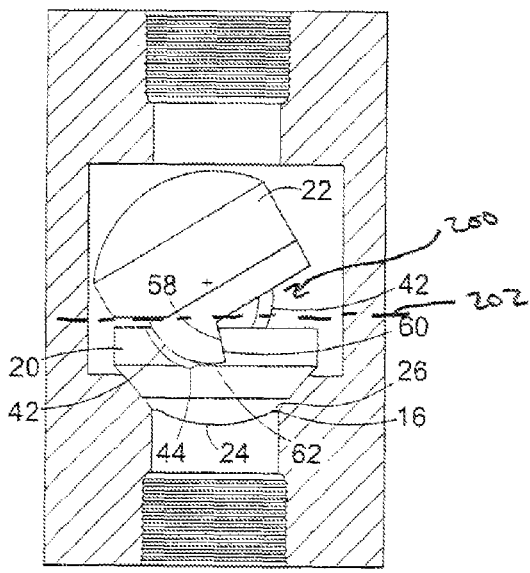
Fig. 4(c)　　　　Fig. 4(d)

AXIALLY ENERGISABLE BALL VALVE

RELATED APPLICATIONS

This application is a continuation-in-part of U.S. patent application Ser. No. 11/793,158, filed Mar. 5, 2008, now abandoned which claims priority from PCT International Application No. PCT/GB2005/004805, filed Dec. 12, 2005 and British Application No. 0427400.7, filed Dec. 15, 2004. The subject matter of the aforementioned applications are hereby incorporated by reference in their entireties.

FIELD OF THE INVENTION

The present invention relates to ball valves and particularly to metal sealing ball valves.

BACKGROUND OF THE INVENTION

Apertured ball valves are well known for controlling the flow of a fluid through a bore, particularly in the oil and chemical process industries. Ball valves are compact, inexpensive and relatively easy to operate.

In an apertured ball valve, the valve operation may be broken down into two separate stages; firstly, the ball moves between an open and a closed position by rotating through 90° such that the ball aperture moves from an orientation coaxial with the flow direction, i.e. when the valve is open, to a position whereby the ball aperture is perpendicular to the flow direction. Secondly, the valve seals in the closed position to prevent flow through the bore across the ball valve.

Conventional ball valves will typically incorporate a seal made of a softer material such as polyetheretherketone (PEEK) or polytetrafluoroethylene (PTFE). However, these materials are vulnerable to degradation over the course of time, and consequently the valve may become unreliable.

In situations requiring the highest sealing integrity to be maintained, metal sealing valves such as gate valves are typically used. These valves are generally larger and more expensive than a ball valve of the equivalent bore size and pressure rating. In certain situations, such as wellhead and in-riser applications, it may be impossible to incorporate a gate valve to provide a metal seal due to the envelope restrictions. In these situations it is common to use a plug type device which incorporates a metal-to-metal seal on which is deployed wireline or coiled tubing. This method of deployment is cumbersome, time consuming and expensive.

Further drawbacks associated with ball valves include problems of distortion of the ball under high pressure due to the presence of a bore through the ball. This distortion can prevent a high integrity seal from being formed between the ball element and the valve housing.

SUMMARY OF THE INVENTION

It is an object of the present invention to obviate or mitigate at least one of the aforementioned disadvantages.

According to a first aspect of the present invention there is provided a ball valve for sealing a conduit comprising:
 a housing having a throughbore and a valve seat;
 an apertured ball element mounted within the housing, the apertured ball element being rotatable about an axis of rotation between a throughbore open and a throughbore closed position, the apertured ball element having a first portion and a second portion coupled together, said first and second portions being rotatable and moveable relative to each other, said first portion having a sealing surface for engaging with said valve seat;
 whereby, in use, in the throughbore closed position, the second portion is moveable relative to said first portion to axially displace the first portion from the axis of rotation towards the valve seat such that said sealing surface on the first portion of the apertured ball forms a seal with valve seat.

Thus, the ball valve of the present invention has a two-portion ball element which is rotatable into the throughbore closed position and the structure is such that continued rotational force causes the second portion to continue to rotate relative to the first portion and convert the rotational force to an axial force which is applied by the second portion to the first portion to make the seal between the first portion sealing surface and the valve seat. This reduces degradation of both the sealing surface of the first portion of the apertured ball and the valve seat.

Furthermore, using a two-part ball element means that the stiffness of the portion which makes the seal, i.e. the first portion, is improved, resulting in less distortion of the sealing surface in high pressure situations.

Preferably, the second portion is adapted to axially displace the first portion from the axis of rotation by a further rotation of the second portion with respect to the first portion.

Preferably, the valve seat and the sealing surface on the first portion of the aperture ball is a metal. Alternatively, at least one of the valve seat and the sealing surface on the first portion of the apertured ball is a polymeric or elastomeric material. In a further alternative, a non-elastomer such as PTFE could be used. Having both the valve seat and sealing surface made from a metal, means that a high integrity metal-to-metal seal may be formed by the ball valve.

The sealing surface may be a combination of materials. In one implementation the sealing surface on the first portion of the apertured ball comprises both a metal and a non-metal. Multiple sealing methods may provide increased reliability of the valve.

The sealing surface of the first portion of the apertured ball may be non-spherical. Preferably, the sealing surface of the first apertured ball portion is substantially conical.

Having the first portion of the apertured ball forming a seal with the valve seat by an axial translation of the first portion onto the valve seat allows the sealing surface of the first portion to have a non-spherical finish. A non-spherical surface, particularly a conical surface, is preferred because it is considerably easier to machine a surface of sufficient quality to form a high integrity seal when the surface is non-spherical.

Preferably, the sealing surface of the first portion of the apertured ball is provided on an element mounted to the first apertured ball portion. This sealing surface element may be a disc.

A separate sealing surface element mounted to the first portion of the ball allows for the sealing surface to be manufactured separately from the ball.

The valve seat may also have a non-spherical surface. The valve seat surface is substantially complementary to the sealing surface of the first ball portion. Most preferably, the valve seat surface is substantially conical. The valve seat may be formed integrally with the housing. Alternatively, the valve seat may be releasably connected to the housing.

Preferably, the sealing surface element is releasably mounted to the first portion of the apertured ball element.

Having the sealing surface element releasably mounted to the ball, permits the element to float into engagement with the valve seat. This feature is useful in the event that the ball should distort, as this distortion may not affect the sealing performance of the valve.

Each of the first portion and the second portion may comprise a plurality of parts.

Preferably, the first and second portions are connected by connection means. Most preferably, the connection means is a c-spring.

A c-spring connecting the first and second portions ensures the two portions rotate together when permitted.

The first and second portions may be releasably connected.

Preferably, the ball valve includes biasing means to bias the first portion towards the second portion.

The use of biasing means permits the first portion to move towards the second portion in an axial direction when the force applied by the second portion is removed. Such an axial movement allows the ball to rotate to the throughbore open position.

The biasing means may be a c-spring.

Preferably, the connecting c-spring is also the biasing c-spring.

Preferably, the ball valve further includes rotation means to rotate the apertured ball between the throughbore open position and the throughbore closed position.

The rotation means may be associated only with the second portion of the apertured ball.

Preferably, the second portion is adapted to axially displace the first portion by means of a cam surface on one of the first or second portions engaging a follower surface on the other of the first or second portions.

Preferably, the cam surface is on the second portion and the follower surface is on the first portion.

Alternatively, the second portion is adapted to axially displace the first portion by means of a separate camming plate, the separate camming plate having a first pin and a second pin extending therefrom, the first pin engaging an annular slot in the surface of the first apertured ball portion, and the second pin engaging an annular slot in the surface of the second apertured ball portion. In this implementation, the slots are selected to cause the required rotational and axial response in the first and second apertured ball portions.

According to a second aspect of the present invention there is provided a method of sealing a throughbore through a housing by an apertured ball valve, the method comprising the steps of:

rotating an apertured ball element from a throughbore open position to a throughbore closed position;

rotating a second portion of the apertured ball element relative to a first portion of the apertured ball element when in said throughbore closed position and axially displacing said first portion onto a valve seat.

whereby said first portion of the apertured ball element is urged into a sealing engagement with a valve seat.

According to a third aspect of the present invention there is provided a ball valve for sealing a conduit with a metal-to-metal seal, such ball valve comprising:

a housing having a throughbore and a valve seat;

an apertured ball element rotatably mounted within said housing between a throughbore open position and a throughbore closed position, said apertured ball element having first and second ball element portions, said portions being moveable relative to each other when said apertured ball valve is in said throughbore closed position;

a metal seal adapted to be disposed between said first ball element portion and said valve seat when said apertured ball element is in said throughbore closed position;

the arrangement being such that, in use, when said apertured ball valve element is in said throughbore closed position, further rotation of said second ball element portion engages with said first ball element portion and displaces said first ball element portion axially to energise said metal seal against said valve seat to provide a ball valve with an energised metal-to-metal seal.

By virtue of the present invention a conduit may be sealed by a ball valve incorporating a metal-to-metal seal.

BRIEF DESCRIPTION OF THE DRAWINGS

The present invention will now be described, by way of example, with reference to the accompanying figures in which:

FIG. 4, comprising FIGS. 4a to 4d, is a series of sectional side views of the ball valve of FIG. 1, drawn on a reduced scale, depicting the movement of the apertured ball from a throughbore open position to a throughbore closed position;

FIG. 6, comprising

DESCRIPTION OF EXAMPLE EMBODIMENTS

Figure 1:
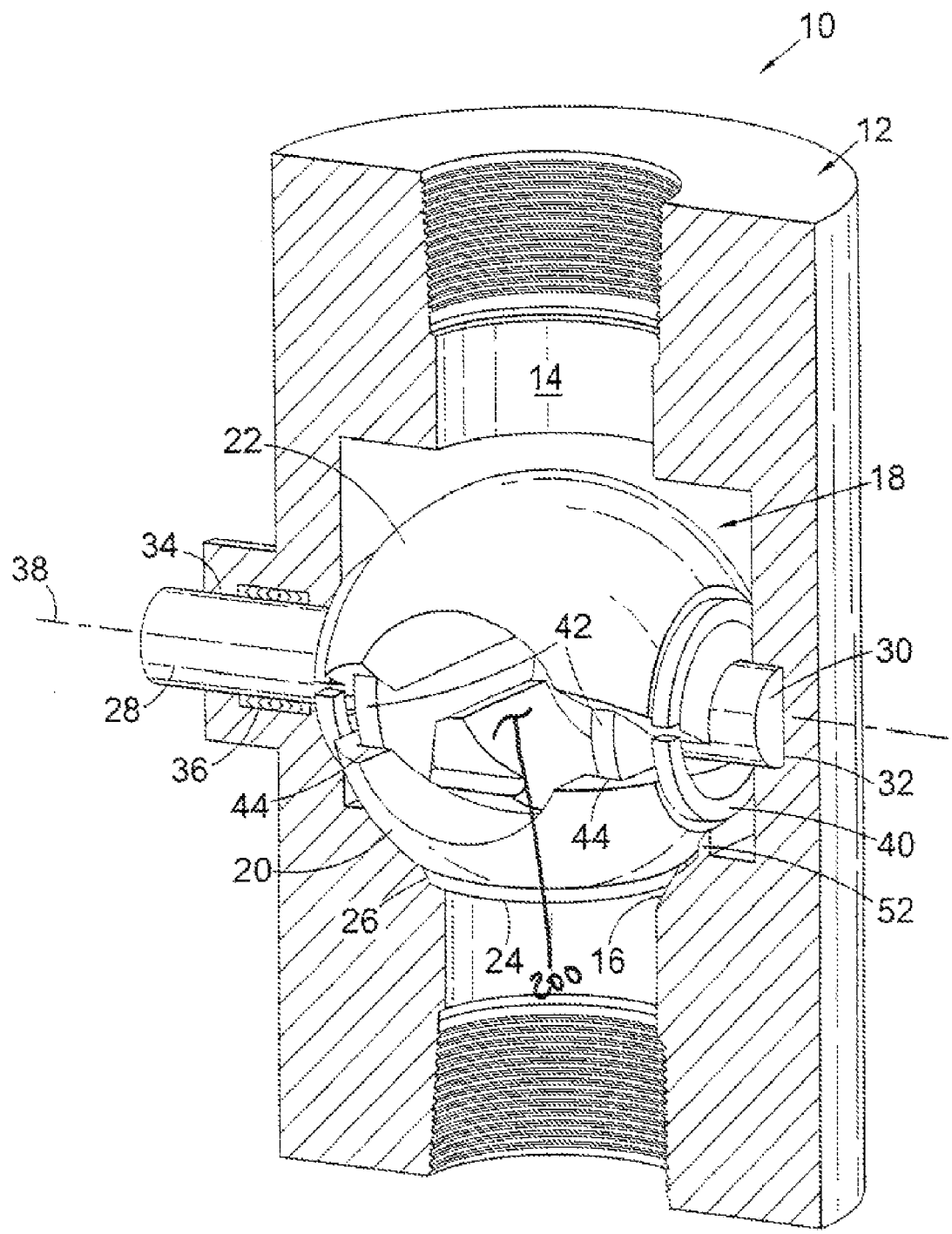
FIG. 1 is a partially cut-away side view of a ball valve in a closed configuration in accordance with a preferred embodiment of the present invention.

Referring firstly to FIG. 1 there is shown a partially cut-away side view of a ball valve, generally indicated by reference numeral 10, in a closed configuration in accordance with the preferred embodiment of the present invention.

The ball valve 10 comprises a housing 12 defining a throughbore 14 and having a valve seat 16. Mounted within the housing 12 is an apertured ball 18, with a ball element aperture 200 extending therethrough. The apertured ball 18 comprises a first portion 20 and a second portion 22, the first and second portions cooperatively defining the ball element aperture 200.

The first portion 20 includes a sealing element 24 with an annular, conical, sealing surface 26, the sealing element 24 is mounted to the first portion 20 and is machined from Inconel 625, a corrosion resistant alloy. The valve seat 16 is also conical in shape and is substantially complementary to the conical surface 26 of the sealing element 24.

Figure 5:
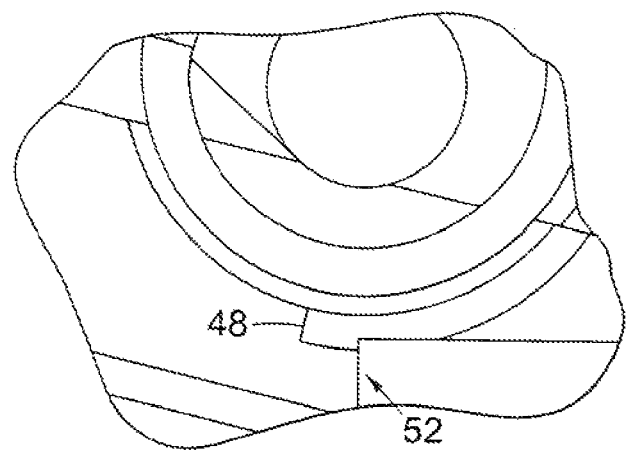
FIG. 5 is an enlarged cut away side view of part of the ball valve of FIG. 1.

The second portion 22 of the apertured ball 18 incorporates a shaft portion 28 via which the apertured ball 18 is rotated about an axis of rotation 38 by a rotary actuator (not shown), as discussed below, in connection with FIG. 6. The shaft 28 passes through a conduit 34 in the housing and is sealed to the housing by means of packing seals 36. The second portion 22 also includes a lug 30 which engages a pocket 32 in the housing 12. The location of the lug 30, the pocket 32, the shaft 28 and the conduit 34 serve to positionally locate the second ball portion 22 with respect to the housing 22. Rotation of the shaft 28 around the axis of rotation 38 causes the second ball portion 22 to rotate into the throughbore open position. The first ball portion 20 is connected to the second ball portion 22 by means of c-spring 40. The c-spring 40 is biased to squeeze the first portion 21 and the second portion 22 together such that they behave substantially as a single ball element. The operation of the ball valve 10 will be discussed in greater detail in connection with FIG. 4 and FIG. 5.

Also visible on FIG. 1 is a nogo 52 which engages the first portion 20 of the apertured ball to prevent rotation of the first portion 20 passed the throughbore closed position. This operation will also be discussed in greater detail in connection with FIG. 4 and FIG. 5.

Figure 2:
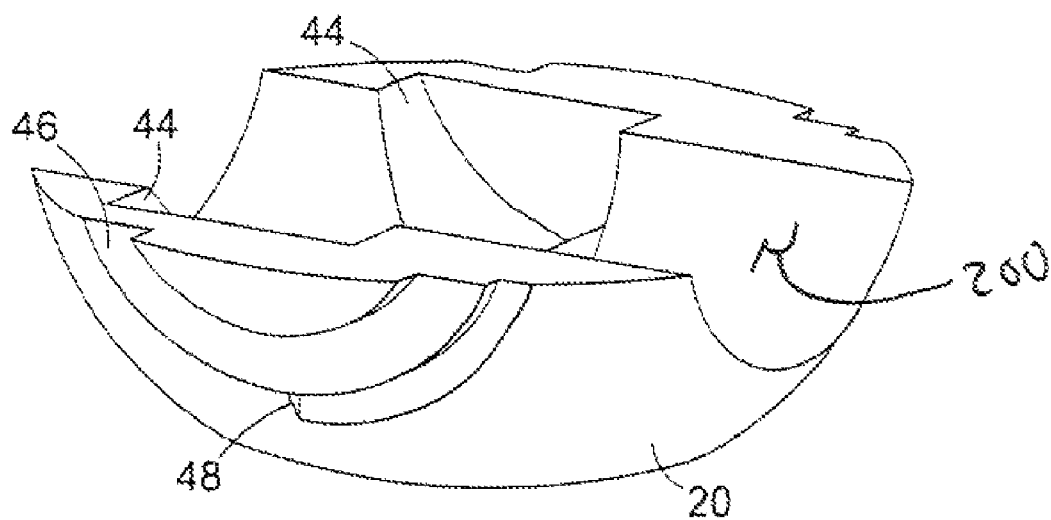
FIG. 2 is an enlarged perspective view of the first portion of the apertured ball of FIG. 1.

The second ball portion 22 includes a pair of cam surfaces 42, and the first ball portion 20 includes a pair of follower surfaces 44. The follower surfaces 44 can be seen more clearly on FIG. 2, a perspective view of the first portion 20 of the apertured ball 18. Also visible on FIG. 2 is a shoulder 46 for receiving the c-spring 40 (shown on FIG. 1). The first ball portion 20 also includes a stop surface 48 which engages the nogo 52 (FIG. 1), as will be discussed in connection with FIGS. 4 and 5. The portion of ball element aperture 200 defined by the first ball portion 20 is also called out in FIG. 2.

Figure 3:
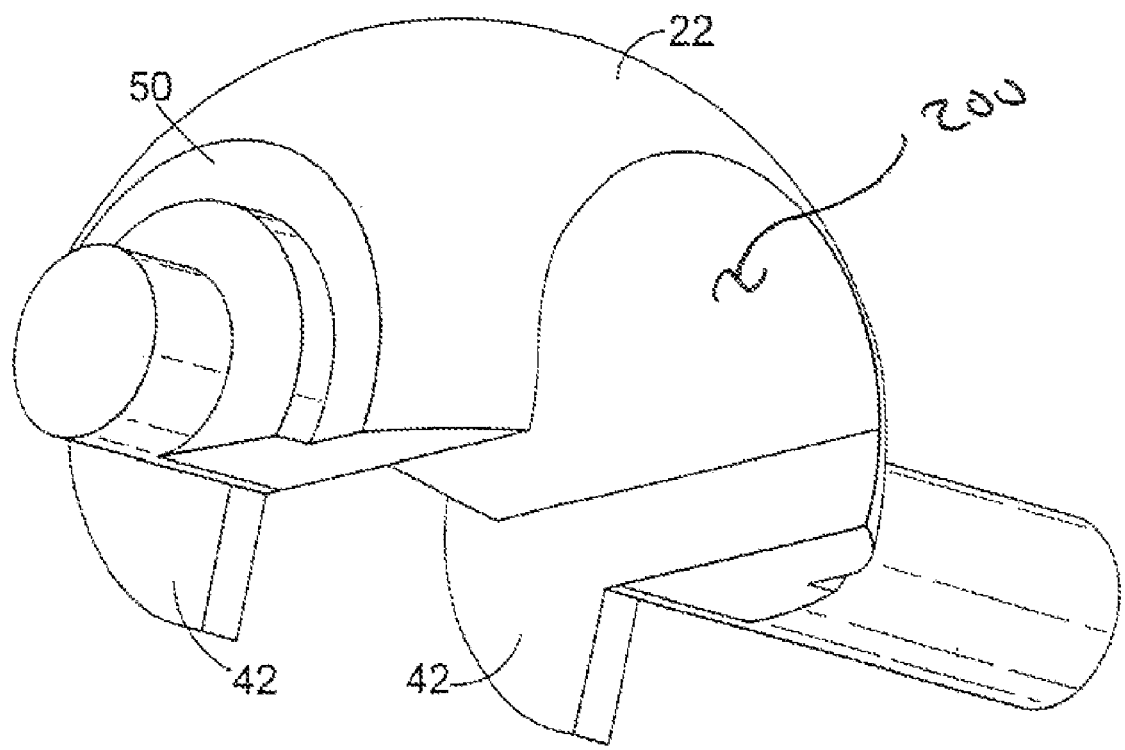
FIG. 3 is an enlarged perspective view of the second portion of the apertured ball of FIG. 1.

The cam surfaces 42 can be seen in FIG. 3, a perspective view of the second portion 22 of the apertured ball 18. The second portion 22 also includes a shoulder 50 for receiving the c-spring 40. The portion of ball element aperture 200 defined by the second ball portion 22 is also called out in FIG. 3.

Referring now to FIG. 4, comprising FIGS. 4a to 4d, there is shown a series of sectional side views of the ball valve 10 depicting the movement of the apertured ball 18 from a throughbore open position to a throughbore closed position.

Referring firstly to FIG. 4a, the apertured ball 18 is shown in the throughbore 14 open position. In FIG. 4a, the ball element aperture 200 has an aperture axis 202, which is substantially collinear with the throughbore 14. The first and second ball portions 20 and 22 move relative to each other during operation of the present invention, thus changing the shape of the ball element aperture 200. Accordingly, the aperture axis 202 is not defined herein as bearing a prescribed relationship to the entirety of the ball element aperture 200 (such as being oriented along a centroid thereof or the like), but instead the aperture axis is arbitrarily shown throughout the Figures as being oriented along a portion of the ball element aperture defined by the first ball portion, for ease of description. To commence sealing of the throughbore 14 the shaft 38 (not visible on FIG. 4) is rotated counter-clockwise around the axis of rotation 38, causing the second ball portion 22 to rotate. The strength of the c-spring 40 (FIG. 1) is sufficient to rotate the first ball portion 20 with the second ball portion 22.

Referring now to FIG. 4b, the apertured ball 18 has rotated around the axis of rotation 38 and the throughbore 14 is closed but not sealed. At this point the no-go 52 engages with the stop surface 48, this can be seen more clearly in FIG. 5, a cut-away side-view of part of the ball valve 10. This engagement prevents further rotation of the first ball portion 20 about the axis of rotation 38. The aperture axis 202 of the ball element aperture 200 is no longer collinear with the throughbore 14.

Referring now to FIG. 4c, continued rotation of the second ball portion 22 about the axis of rotation 38, of sufficient magnitude to overcome the squeezing effect of the c-spring 40 (FIG. 1), causes the leading edge 54 of the cam surface 42 to overcome a step 56 on the follower surface 44. This action axially displaces the first portion 20 of the apertured ball 18 from the axis of rotation and forms a seal between the sealing surface 26 of the sealing element 24 and the valve seat 16. The aperture axis 202 of the ball element aperture 200 remains non-collinear with the throughbore 14.

Referring now to FIG. 4d, the second portion 22 continues to rotate until a second portion surface 58 engages a first portion surface 60 which prevents the second portion 22 from further rotation. The complete rotation of the second ball element spans 120°. The aperture axis 202 of the ball element aperture 200 is no longer collinear with the throughbore 14. Depending upon the portion of the ball element aperture 200 which is used to define the aperture axis (as described above), the angle of the aperture axis to the throughbore may change slightly from that shown, but will not be collinear with the throughbore 14 when the ball valve 10 is in the positions shown in FIGS. 4b, 4c, and 4d.

The inter-action of the cam surface 42 and the section 62 of the follower surface 44 maintains the seal between the sealing surface 26 of the sealing element 24 and the valve seat 16, and prevents the first portion 20 moving axially towards the second ball portion 22 under the action of c-spring 42.

Figure 6A:
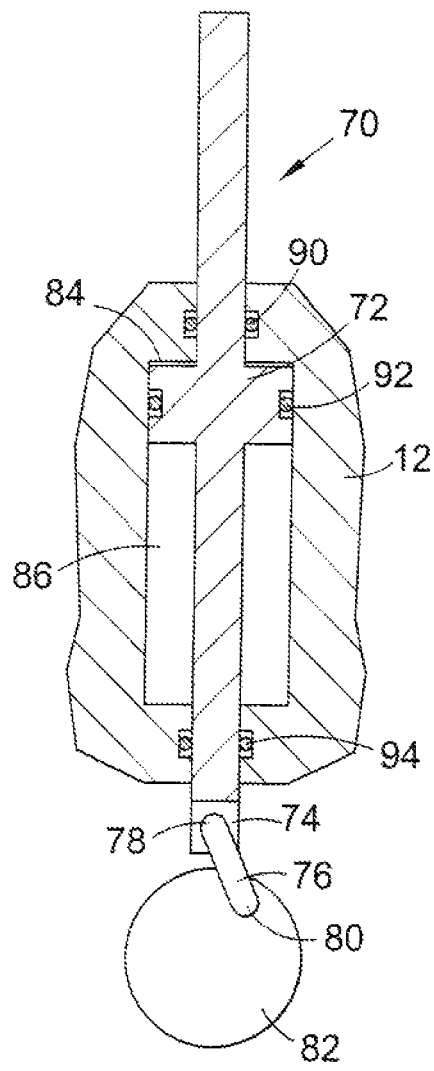
FIGS. 6a and 6b, is a cut away side view of rotary actuator for rotating the apertured ball of FIG. 1.
Figure 6B:
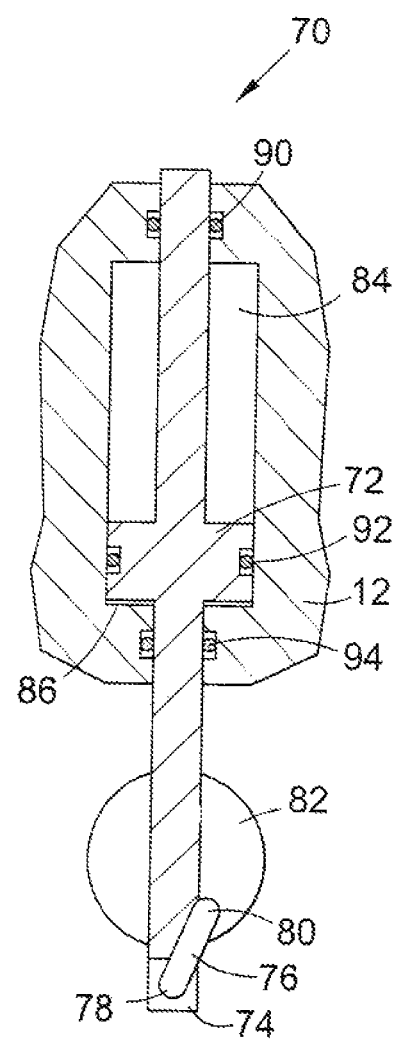

Referring to FIG. 6, comprising FIGS. 6a and 6b, there is shown a cut away side view of rotary actuator, generally indicated by reference numeral 70, for rotating the apertured ball 18 of FIG. 1.

The rotary actuator 70 comprises a double acting hydraulic piston 72 disposed in the valve housing 12. Connected to the lower end 74 of the piston 72 is a link arm 76 via a pin jointed connection 78. The link arm 76 is eccentrically connected via a pin joint 80 to a large diameter hub 82. The hub 82 is concentrically connected to the end of the shaft portion 28 (not shown in FIG. 6).

The rotary actuator 70 includes an upper hydraulic fluid chamber 84 and a lower hydraulic fluid chamber 86. The upper hydraulic fluid chamber 84 is defined by the piston 72 and the housing 12, and is sealed by an upper ring seal 90 and a piston ring seal 92. The lower hydraulic fluid chamber 84 is defined by the piston 72 and the housing 12, and is sealed by a lower ring seal 94 and the piston ring seal 92.

Referring to FIG. 6a, to rotate the apertured ball 18 from a throughbore open to a throughbore closed position, the lower piston chamber 86 is vented and hydraulic fluid is pumped into the upper piston chamber 84, permitting the piston 72 to move to the position shown in FIG. 6b.

During the movement of the piston 72 to the position shown in FIG. 6b, the link arm 76 maintains a constant distance between the piston end 74 and the pin joint 80, connecting the link arm 76 to the hub 82, forcing the hub 82 to rotate to the position shown in FIG. 6b. Between in FIGS. 6a and 6b, the hub 82, and the second apertured ball portion 22, have rotated 120°; the degree of rotation required to engage the seal element 24 with the valve seat 16.

Various modifications may be made to the embodiment hereinbefore described without departing from the scope of the invention. For example, it will be understood that although the valve seat 16 is shown machined into the surface of the housing 12, it could equally be formed on a separate seal seat which is inserted into the surface of the housing 12. Similarly, the sealing surface 26 which is defined by the seal element 24 could equally be defined by the outer surface of the first ball portion 20. Additionally, although the cam surface is shown associated with the second ball portion 22 and the follower surface 44 is shown associated with the first ball portion 20, this relationship could be reversed.

Figure 8:
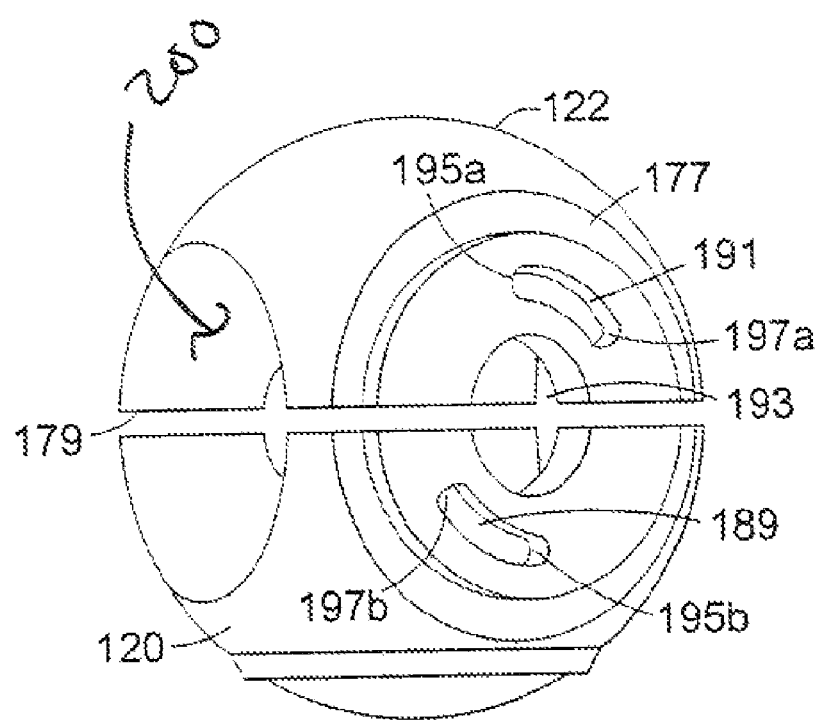
FIG. 8 is a perspective view of the ball of the ball valve of FIG. 7.

FIG. 8 shows a perspective view of part of a ball valve, generally indicated by reference numeral 110, in accordance with an alternative embodiment of the present invention.

The ball valve 110 comprises an apertured ball 118 located within a housing 112 (shown in broken outline). The apertured ball 118 comprises a first portion 120 and a second portion 122, the first and second ball elements 120,122 are secured together by C-springs (not shown).

The first portion 120 includes a sealing element 124 with an annular, conical, sealing surface 126, the sealing element 124 is machined from Inconel 625, a corrosion resistant alloy and is mounted to the first portion 120. The sealing element 124 is adapted to engage a valve seat 116 located in the housing 112.

Located on a first side 177 of the apertured ball 118 is a camming plate 181.

Figure 9:
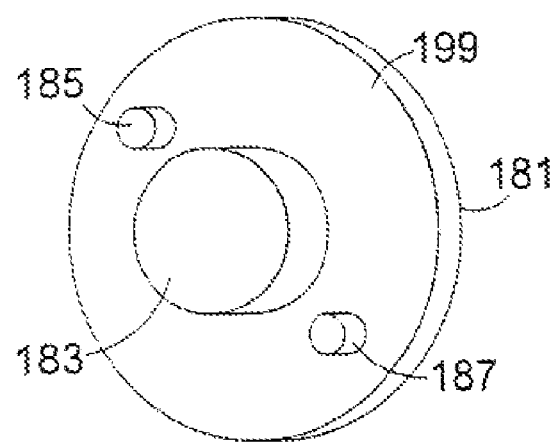
FIG. 9 is a perspective view of the camming plate of the ball valve of FIG. 7.

The camming plate 181, best seen in FIG. 9, includes a boss 183 and a pair of studs 185, 187 extending from a surface 199 of the camming plate 181.

The first portion 120 of the apertured ball 118 includes a first groove 189 and the second portion 122 of the apertured ball 118 includes a second groove 191. Each of the grooves 189, 191 is sized to receive one of the studs 185, 187. The boss 183 is received in an aperture 193 defined by the first and second ball portions 120, 122. The first groove 189 is arranged to be non-concentric with the aperture 193, whereas the second groove 191 is arranged to be concentric with the aperture 193.

Figure 7:
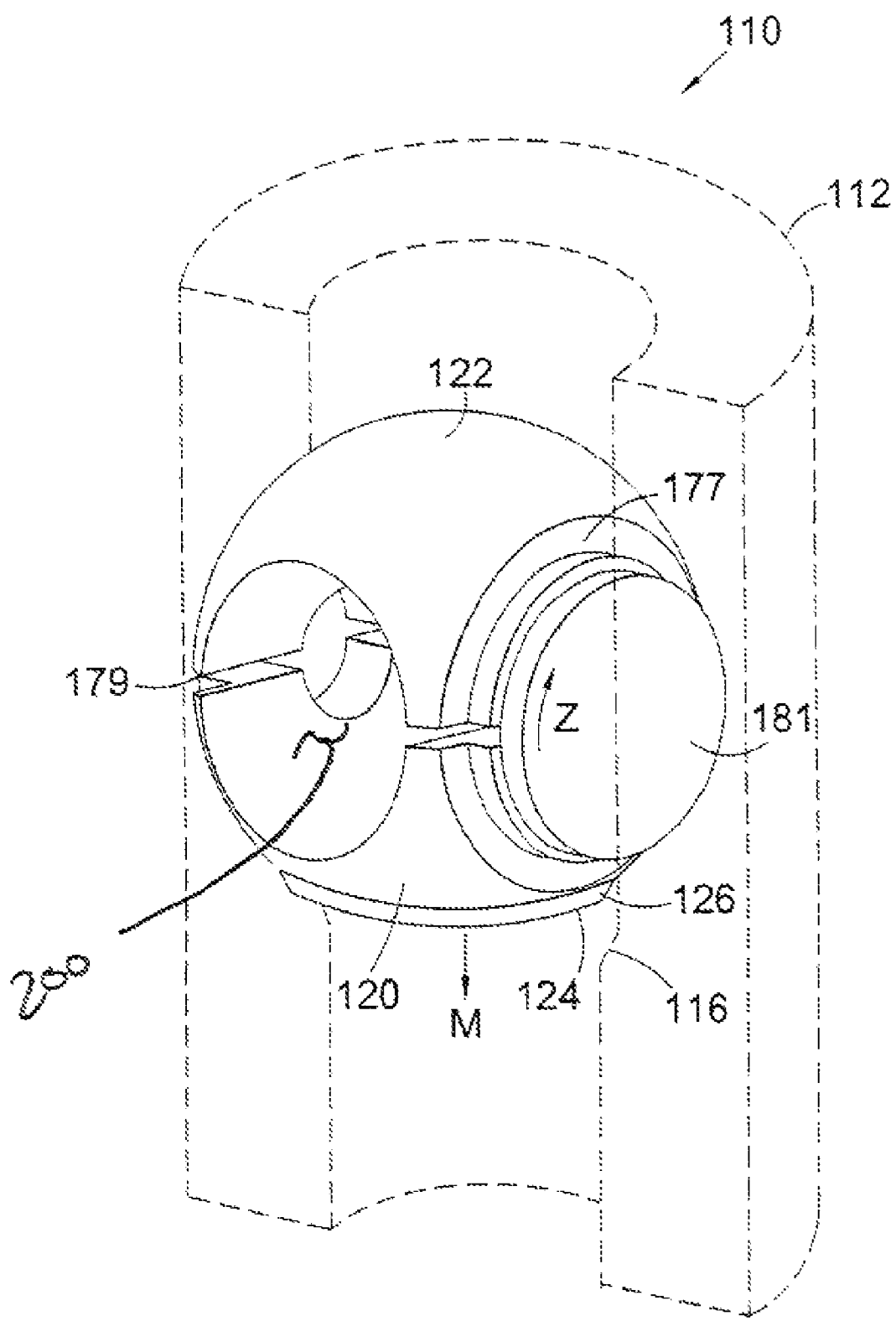
FIG. 7 is a perspective view of part of a ball valve in accordance with an alternative embodiment of the present invention.

To activate the valve 110 from the throughbore open position to a throughbore closed position, a turning force is applied by an actuator (not shown) to a second side 179 of the apertured ball 118. Once the ball 118 is in the throughbore closed position the sealing element 124 is axially displaced to engage the valve seat 116 by applying a clockwise turning force (in the direction of arrow "z" on FIG. 7) to the camming plate 181.

This turning force rotates the camming plate 181 and the studs 185, 187 move along the grooves 189, 191 from a first end 195a, 195b to a second end 197a, 197b.

As the second groove 191 is concentric with the aperture 193, the rotation of the camming plate 181 has no effect on the second portion 122. However, as the first groove 189 is non-concentric with the aperture 193, the rotation of the camming plate 181 and the movement of the stud 187 from the first end 195b to the second end 197b of the groove 189 causes the first ball portion 120 to move towards the valve seat 116, that is, in the direction of arrow "M" on FIG. 7. The axial force generated causes the sealing element 124 to engage the valve seat 116 as for the first embodiment.

Those of skill in the art will also recognise that the above described embodiment of the invention provides a metal to metal sealing ball valve which can seal a conduit with minimal impact on the bore of the conduit in the open configuration. The ball valve also provides a known angular displacement of 120° between the throughbore fully open and the throughbore sealed positions permitting a high level of valve control.

The invention claimed is:

1. A method of sealing a throughbore through a housing by an apertured ball valve, the method comprising the steps of:
providing an apertured ball element having first and second portions cooperatively defining a ball element aperture,
rotating the apertured ball element from a throughbore open position, in which an aperture axis of the ball element aperture is substantially collinear with the throughbore to a throughbore closed position, in which the aperture axis of the ball element aperture is not collinear with the throughbore;
rotating the second portion of the apertured ball element relative to the first portion of the apertured ball element when in said throughbore closed position and axially displacing said first portion onto a valve seat;
whereby said first portion of the apertured ball element is urged into a sealing engagement with the valve seat.

2. A ball valve for sealing a conduit comprising:
a housing having a throughbore and a valve seat;
an apertured ball element mounted within the housing, the apertured ball element being rotatable about an axis of rotation between a throughbore open and a throughbore closed position, the apertured ball element having a first portion and a second portion coupled together, the first and second portions cooperatively defining a ball element aperture having an aperture axis which is substantially collinear with the throughbore in the throughbore open position, said first and second portions being rotatable and moveable relative to each other, said first portion having a sealing surface for engaging with said valve seat;
whereby, in use, in the throughbore closed position, the aperture axis of the ball element aperture is not collinear with the throughbore, and the second portion is moveable relative to said first portion to axially displace the first portion from the axis of rotation towards the valve seat such that said sealing surface on the first portion of the apertured ball forms a seal with the valve seat.

3. The ball valve of claim 2 wherein the second portion is adapted to axially displace the first portion from the axis of rotation by a further rotation of the second portion with respect to the first portion.

4. The ball valve of claim 2 wherein the valve seat and the sealing surface on the first portion of the aperture ball is a metal.

5. The ball valve of claim 2 wherein at least one of the valve seat and the sealing surface on the first portion of the apertured ball is at least one of a polymeric material and an elastomeric material.

6. The ball valve of claim 2 wherein the sealing surface on the first portion of the apertured ball is a combination of materials.

7. The ball valve of claim 6 wherein the sealing surface on the first portion of the apertured ball comprises both a metal and a non-metal.

8. The ball valve of claim 2 wherein the sealing surface of the first portion of the apertured ball is non-spherical.

9. The ball valve of claim 8 wherein the sealing surface of the first apertured ball portion is substantially conical.

10. The ball valve of claim 2 wherein the sealing surface of the first portion of the apertured ball is provided on an element mounted to the first apertured ball portion.

11. The ball valve of claim 10 wherein the sealing surface element is a disc.

12. The ball valve of claim 2 wherein the valve seat has a non-spherical surface.

13. The ball valve of claim 12 wherein the valve seat surface is substantially conical.

14. The ball valve of claim 2 wherein the valve seat is formed integrally with the housing.

15. The ball valve of claim 2 wherein the valve seat is releasably connected to the housing.

16. The ball valve of claim 10 wherein the sealing surface element is releasably mounted to the first portion of the apertured ball element.

17. The ball valve of claim 2 wherein each of the first portion and the second portion may comprise a plurality of parts.

18. The ball valve of claim 2 wherein the first and second portions are connected by connection means.

19. The ball valve of claim 18 wherein the connection means is a c-spring.

20. The ball valve of claim 18 wherein the first and second portions are releasably connected.

21. The ball valve of claim 19 wherein the ball valve includes biasing means to bias the first portion towards the second portion.

22. The ball valve of claim 21 wherein the biasing means is a c-spring.

23. The ball valve of claim 22 wherein the connecting c-spring is also the biasing c-spring.

24. The ball valve of claim 2 wherein the ball valve further includes rotation means to rotate the apertured ball between the throughbore open position and the throughbore closed position.

25. The ball valve of claim 24 wherein the rotation means is associated only with the second portion of the apertured ball.

26. The ball valve of claim 2 wherein the second portion is adapted to axially displace the first portion by means of a cam surface on one of the first or second portions engaging a follower surface on the other of the first or second portions.

27. The ball valve of claim 26 wherein the cam surface is on the second portion and the follower surface is on the first portion.

28. A ball valve for sealing a conduit with a metal-to-metal seal, such ball valve comprising:
   a housing having a throughbore and a valve seat;
   an apertured ball element rotatably mounted within said housing between a throughbore open position, in which a ball element aperture has an aperture axis is substantially collinear with the throughbore, and a throughbore closed position, in which the aperture axis of the ball element aperture is not collinear with the throughbore, said apertured ball element having first and second ball element portions cooperatively defining the ball element aperture, said first and second portions being moveable relative to each other when said apertured ball valve is in said throughbore closed position;
   a metal seal adapted to be disposed between said first ball element portion and said valve seat when said apertured ball element is in said throughbore closed position;
   the arrangement being such that, in use, when said apertured ball valve element is in said throughbore closed position, further rotation of said second ball element portion engages with said first ball element portion and displaces said first ball element portion axially to energise said metal seal against said valve seat to provide a ball valve with an energised metal-to-metal seal.

29. The ball valve of claim 28 wherein the second ball element portion is adapted to axially displace the first ball element portion by means of a separate camming plate, the separate camming plate having first and second pins extending therefrom, the first pin engaging an annular slot in the surface of the first ball element portion, and the second pin engaging an annular slot in the surface of the second ball element portion.

* * * * *